United States Patent

Cherry, Jr. et al.

[11] Patent Number: 5,959,421
[45] Date of Patent: Sep. 28, 1999

[54] MOTOR DIRECTION CONTROL DEVICE FOR ELECTROMOTIVE VEHICLES

[75] Inventors: Wesley Robert Cherry, Jr., Mayfield Heights; Edward V. Leskovec, Eastlake, both of Ohio

[73] Assignees: Daewoo Heavy Industries Ltd., Incheon, Rep. of Korea; Daewoo Heavy Industries America Corporation, Carlstadt, N.J.

[21] Appl. No.: 09/001,518

[22] Filed: Dec. 31, 1997

[51] Int. Cl.$^6$ .............................. B62D 5/04; H02K 23/00
[52] U.S. Cl. .......................... 318/432; 318/430; 318/489; 318/439; 180/19.3
[58] Field of Search .................... 318/430–480, 318/138, 139; 180/19.3, 6.5, 168, 19.1

[56] References Cited

U.S. PATENT DOCUMENTS

| | | | |
|---|---|---|---|
| 4,686,438 | 8/1987 | Ohe et al. | 318/280 |
| 4,699,239 | 10/1987 | Ishino et al. | 180/315 |
| 5,125,468 | 6/1992 | Coker | 180/13 |
| 5,504,403 | 4/1996 | McLaughlin | 318/432 |
| 5,530,788 | 6/1996 | Saijima | 388/811 |
| 5,636,137 | 6/1997 | Hazelden | 364/507.444 |
| 5,652,487 | 7/1997 | Nishino et al. | 318/434 |
| 5,657,828 | 8/1997 | Nagamachi | 180/19.3 |

*Primary Examiner*—Paul Ip
*Attorney, Agent, or Firm*—Lowe Hauptman Gopstein Gilman & Berner

[57] ABSTRACT

A motor direction control device id used for electromotive vehicles which has an electric motor adapted to cause the vehicles to move forwards and backwards. The motor direction control device includes a direction control level shiftable from a neutral position into forward or reverse position. Operatively connected to the direction lever is an elongated pliable strip which is slidable along a predefined moving way by the shifting operation of the direction control lever and carries a permanent magnet. First and second magnetolectric sensors are arranged in a spaced-apart relationship with each other along the moving way of the elongated strip, each of the magnetoelectric sensors capable of generating, when left deactivated, a position signal of first logic level and activatable by the permanent magnet to produce a position signal of second logic level as the direction control lever is shifted into the forward or reverse position. Responsive to the position signals of first and second logic levels, a microprocessor is adapted to control the direction of rotation of the electric motor. A Hall generator may be utilized as the magnetoelectric sensors.

14 Claims, 5 Drawing Sheets

MOTOR DIRECTION CONTROL DEVICE FOR ELECTROMOTIVE VEHICLES

FIELD OF THE INVENTION

The present invention is directed to a motor direction control device for electromotive vehicles which takes advantage of magnetoelectrically generated digital signals to control the direction of rotation of an electric drive motor. The invention is particularly adapted for use in an electric forklift truck employing an electric drive motor whose direction of rotation is changed by the actuation of a direction control lever but whose torque and speed varies with the swing angle of an accelerator pedal.

BACKGROUND OF THE INVENTION

Electromotive vehicles such as electric passenger cars, electric golf carts and electric forklift trucks, for instance, rely on an electric drive motor to acquire the torque needed to move forwards or backwards. Taking the electric forklift truck as an example, it employs a battery-driven electric motor which can rotate with a controlled torque and in a controlled direction. The direction of rotation of the electric motor is controlled by a direction control lever swingably mounted on one side of a truck console. The direction control lever swingably mounted on one side of a truck console. The direction control lever is hand-operated to shift between a forward position, a neutral position and a reverse position. Cooperating with the direction control lever are forward and reverse microswitches coupled to a microprocessor that, in response to the electric signals supplied from the microswitches, controls the flow of electric current to the electric motor. The forward microswitch becomes active to feed forward drive signals to the microprocessor when the direction control lever is shifted into the forward position, whereas the reverse microswitch is rendered active to feed reverse drive signals to the microprocessor if the direction control lever is swung into the reverse position. The forward and reverse microswitches remain inactive, when the direction control lever is in the neutral position, to have the microprocessor cause the electricity supply to the electric motor.

In the meantime, the acceleration of the electric motor employed in the electric forklift truck depends on the swing angle of a foot-operated accelerator pedal depressibly mounted on the floor of the forklift truck. The accelerator pedal is normally biased by a tension spring into an initial position in which the electric motor produces little or no torque. As the swing angle of the accelerator pedal grows larger, the torque produced by the electric motor is progressively increased such that the forklift truck can move at an accelerated speed. Such acceleration of the electric motor is controlled by way of detecting the variation of the pedal swing angle and regulating the amount of electric current to be supplied to the electric motor. The task of detecting the swing angle variation has heretofore been carried out either by means of photoelectric sensors which are arranged to become active one by one and to generate digital signals corresponding to the pedal swing angle, or a potentiometer which is designed to measure the electromotive forces induced by the swinging movement of the pedal and to generate analog signals corresponding to the electromotive forces. The digital or analog signals are fed to the microprocessor which in turn functions to regulate the current supply amount to the electric motor to thereby control the torque and speed of the latter.

As referred to above, the direction of rotation and the acceleration of the forklift electric motor are controlled by the microprocessor in response to the input signals fed from the microswitches associated with the direction control lever and the photoelectric sensors or the potentiometer associated with the accelerator pedal. Setting aside the accelerator device, the prior art motor direction control device has a deficiency in that the microswitches lack durability in the long term use and is susceptible to damage or failure due to the frequent mechanical contacts with the actuator portion of the direction control lever. Moreover, the microswitches employed in the prior art motor direction control device has a tendency to make the console of an electromotive vehicle bulky and complicated in structure.

SUMMARY OF THE INVENTION

Taking the drawbacks of the prior art motor direction control device into account, it is an object of the invention to provide a motor direction control device for electromotive vehicles which can be used without malfunction or damage for an extended period of time, while reducing the volume and complexity of a vehicle console.

In accordance with the invention, there is provided a motor direction control device for electromotive vehicles which has an electric motor adapted to cause the vehicles to move forwards and backwards. The motor direction control device includes a direction control lever shiftable from a neutral position into a forward or reverse position. Operatively connected to the direction control lever is an elongated pliable strip which is slidable along a predefined moving way by the shifting operation of the direction control lever and carries a permanent magnet. First and second magnetoelectric sensors are arranged in a spaced-apart relationship with each other along the moving way of the elongated strip, each of the magnetoelectric sensors capable of generating, when left deactivated, a lever position signal of first logic level and activatable by the permanent magnet to produce a lever position signal of second logic level as the direction control lever is shifted into the forward or reverse position. Responsive to the lever position signals of first and second logic levels, a microprocessor is adapted to control the direction of rotation of the electric motor. A Hall generator may be utilized as the magnetoelectric sensors.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
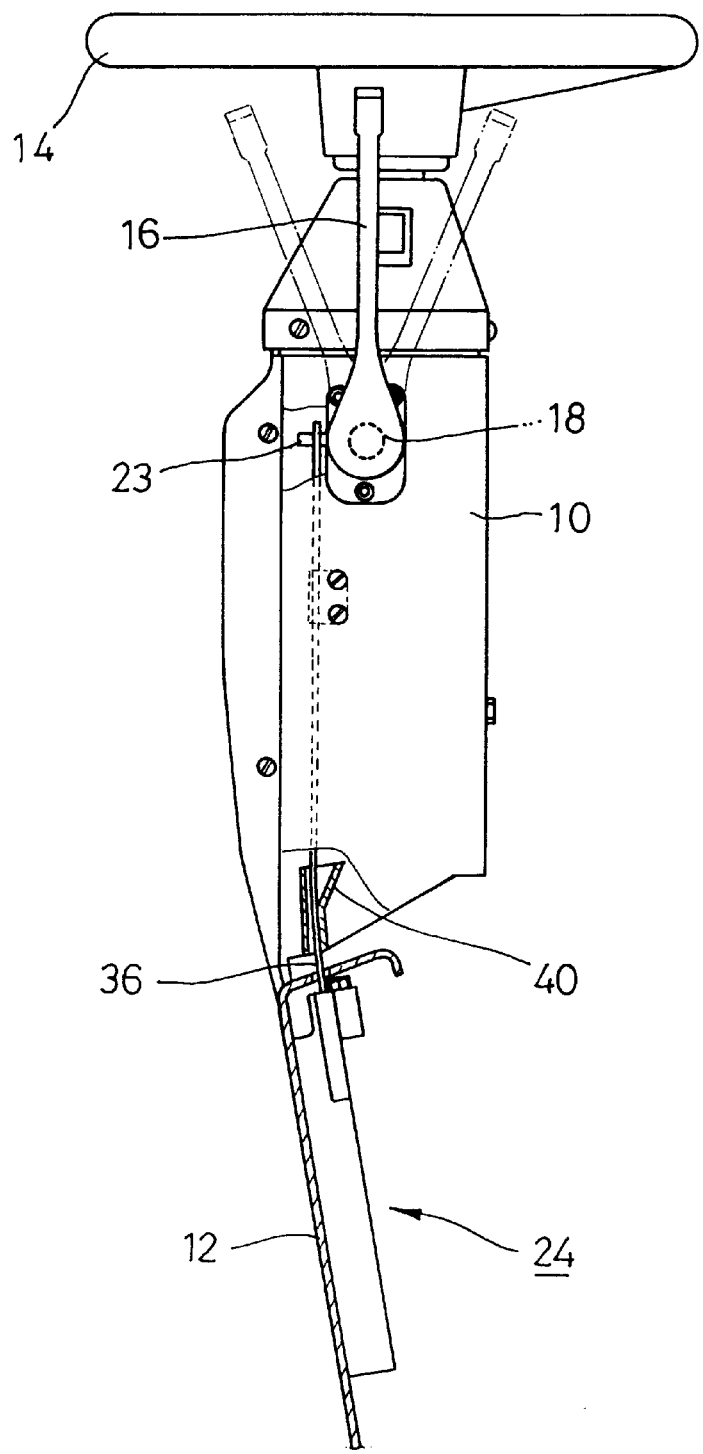
FIG. 1 is a partially cut away side elevational view showing a forklift truck console and cowl incorporating a motor direction control device in accordance with the invention.

It can be seen in FIG. 1 that an electromotive vehicle, e.g., electric forklift truck, includes a console 10 and a cowl 12 provided one above the other in front of a cabin (not shown) of the forklift truck. On the top of the console 10, a steering wheel 14 is mounted to enable a driver to steer the truck. Attached to one side of the console 10 is a direction control lever 16 which can be shifted by the bands of the driver from a neutral position illustrated in a solid line in FIG. 1 either into a forward position shown in a single dotted chain line or a reverse position indicated in a double dotted chain line. As most clearly noted in FIG. 3, the direction control lever 16 has a pivot shaft 18 swingably attached to the side wall 10a of the console 10 by means of a mounting bracket 20 which is provided with a through-hole 20a for receiving the pivot shaft 18. A snap ring 22 is used to keep the pivot shaft 18 in place. Affixed at a generally 90° angle to the pivot shaft 18 is an anchor rod 23 which passes through the round hole of an elongated pliable plastic strip set forth later. Accordingly, the anchor rod 23 can be swung upwards or downwards as the direction control lever 16 is shifted from the neutral position into the forward or reverse position.

Figure 4:
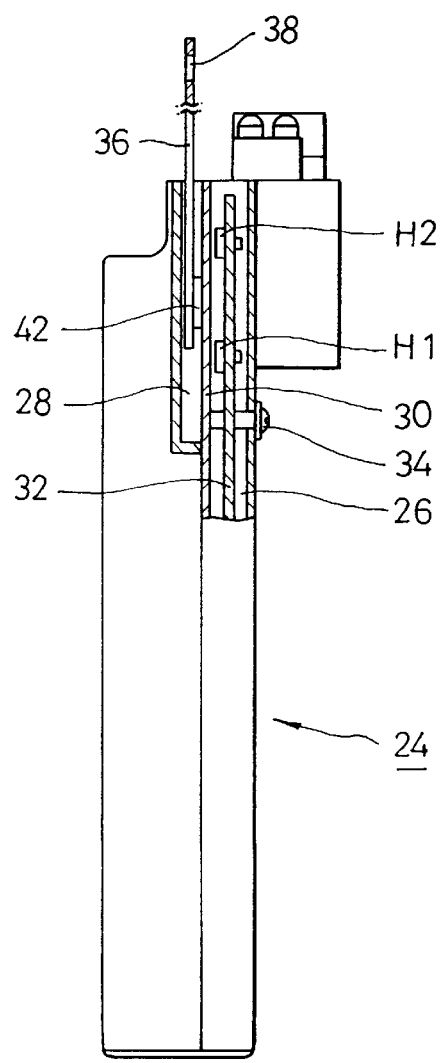
FIG. 4 is a side elevation sectional view showing a controller casing and an elongated pliable strip slidably received in the guide channel of the controller casing and carrying a permanent magnet.
Figure 5:
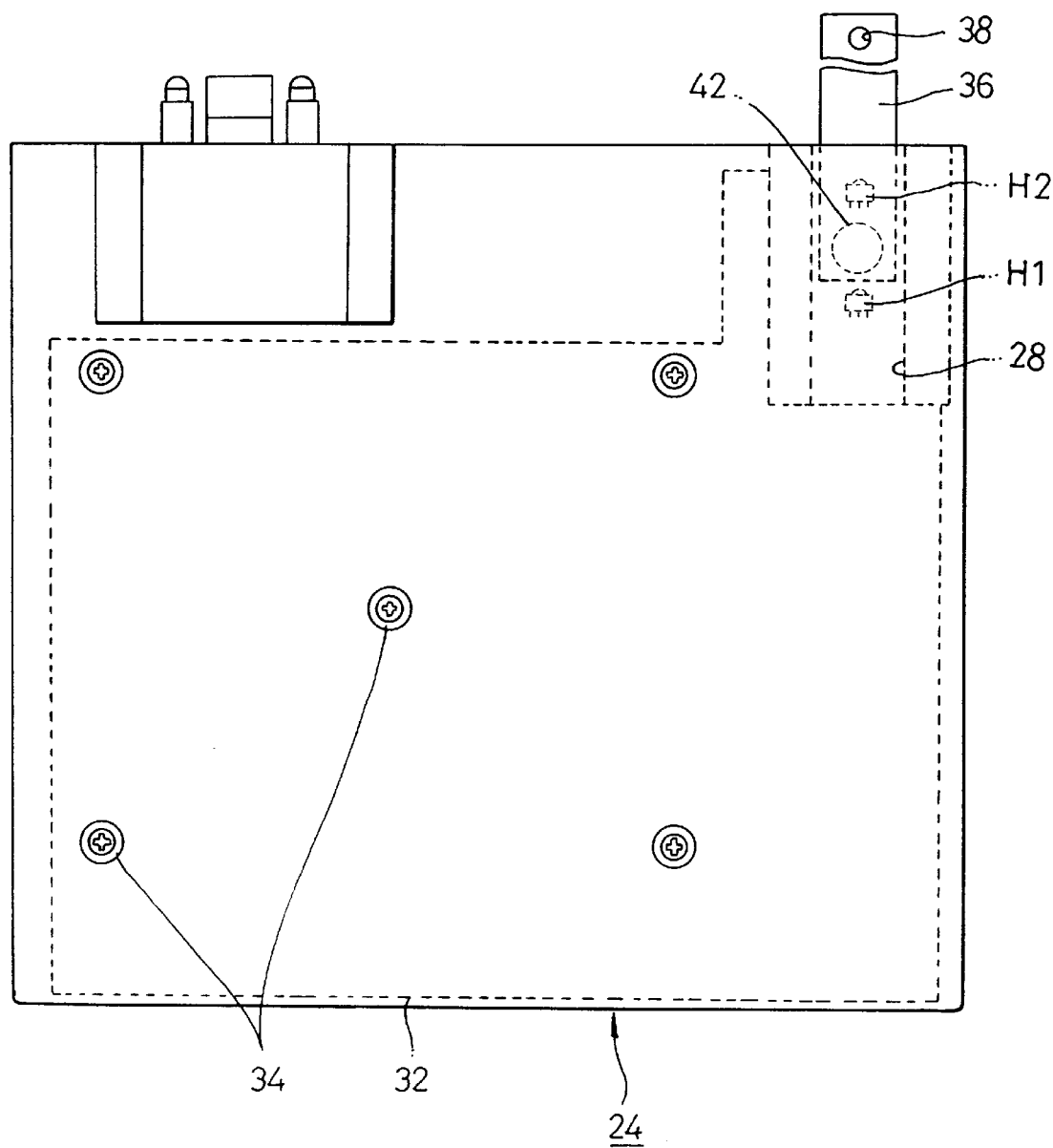
FIG. 5 is a front elevational view of the controller casing and the elongated pliable strip as illustrated in FIG. 4.
Figure 6:
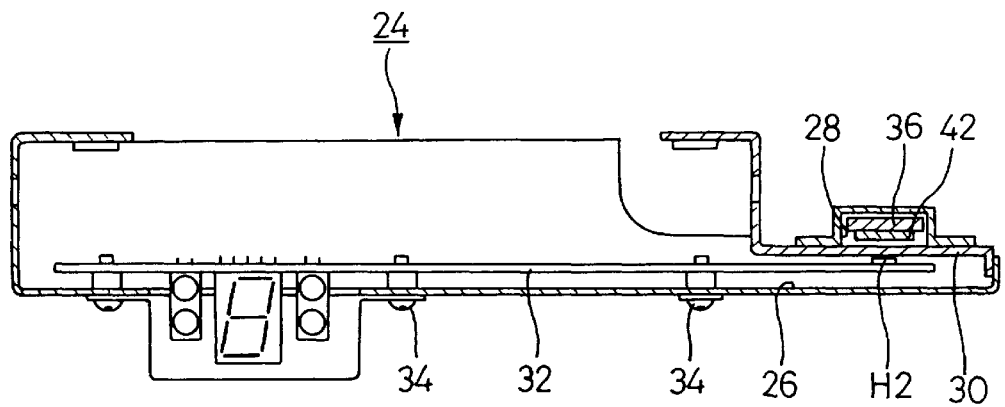
FIG. 6 is a top sectional view of the controller casing and the elongated pliable strip as depicted in FIGS. 4 and 5.

A controller casing, generally designed at 24, is fixedly attached to the inside of the cowl 12. As best illustrated in FIGS. 4, 5 and 6, the controller casing 24 has a board chamber 26 and a guide channel 28, both of which are divided and physically separated from each other by a partition wall 30. The board chamber 26 is closed at its bottom end but has a top access opening which remains sheltered by the rearwardly extending top section of the cowl 12. This assures that the board chamber 26 is free from water intrusion which would otherwise result in failure or damage of electronic components received therein. Inside the board chamber 26, a logic board 32 having a multiplicity of electronic components is removably mounted by set screws 34. Some of the electronic components of the logic board 32 are adapted to constitute a microprocessor whose function will be set forth later with reference to FIG. 7. It is preferred that the controller casing 24 should be made of anti-magnetic materials, e.g., stainless steel, so as not to disturb the flows of the magnetic flux of a permanent magnet described infra.

Figure 3:
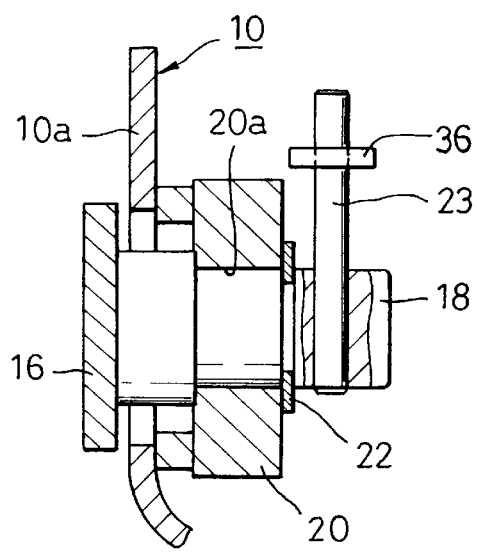
FIG. 3 is a sectional view taken along line III—III in FIG. 2 and showing the pivot arrangement of a direction control lever attached to the console.

The guide channel 28 of the controller casing 21 has a far smaller width than the board chamber 26 and is disposed along one lateral edge of the controller casing 24, as clearly seen in FIGS. 5 and 6. Similar to the board chamber 26, the guide channel 28 is closed at its bottom end and opened at the top end thereof. At least partially inserted through the guide channel 28 and slidable along a predefined moving way is a slider, e.g., elongated pliable plastic strip 36, which has at its top end a round hold 38 engageable with the anchor rod 23 is shown in FIGS. 1 and 3.

Figure 2:
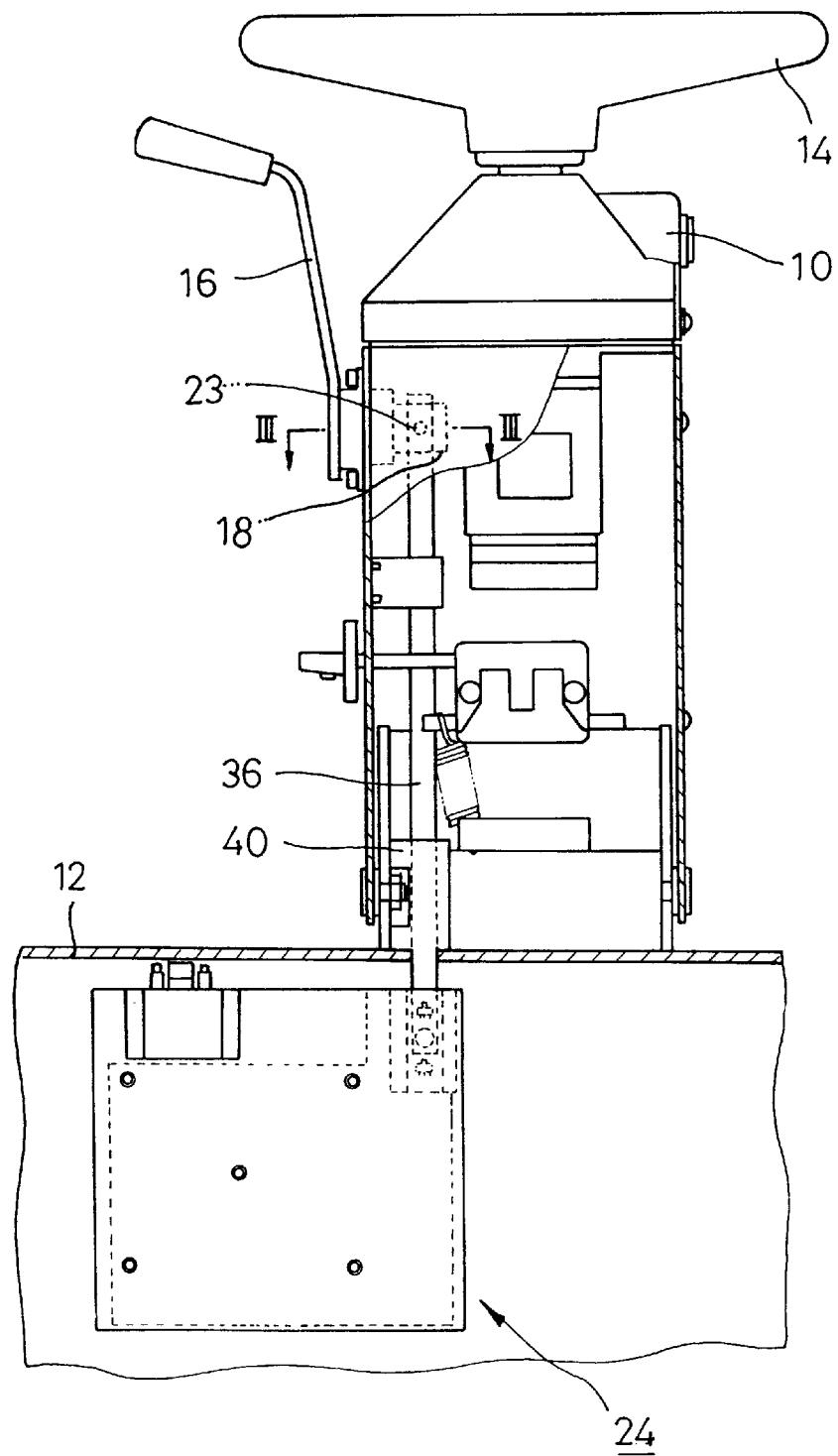
FIG. 2 is a partially cut away rear elevational view illustrating the console and cowl along with the invention device as shown in FIG. 1.

It can be noted in FIGS. 1 and 2 that the plastic strip 36 extends downwards from the top anchored end past it guide bracket 40 which is secured to the console 10 to define the moving way of the plastic strip 36. A sensor activator, e.g., permanent magnet 42, of generally disk shape is affixed to the bottom ed of the plastic strip 36 so a to face the logic board 32 and to move along the guide channel 28 in unison with the plastic strip 36.

First and second magnetoelectric lever position sensors, e.g., Hall generators H1 and H2, are affixed to the logic board 32 in a spaced-apart relationship with each other. The Hall generators H1 and H2 are arranged on the logic board 32 in alignment with the guide channel 28, namely, along the predefined moving way of the plastic strip 36 and the permanent magnet 42 such that, as the magnet 42 traverses just above and over the respective one of the Hall generators H1 and H2, the corresponding Hall generator can be activated by the magnetic flux of the permanent magnet 42 and produce an output voltage signal of logic level zero ("0"). It should be appreciated that each of the Hall generators H1 and H2 continues to remain inactive and thereby give an output voltage signal of logic level one ("1") so long as it is out of alignment with the permanent magnet 42. The spacing between the first and second hall generators H1 and H2 is large enough to assure that neither the first Hall generator H1 nor the second Hall generator H2 is activated when the magnet 42 lies between the Hall generators H1 and H2.

Turning now to FIG. 5, there is shown a block diagram in which a microprocessor 14 is coupled to the first and second Hall generators H1 and H2 via a latch 46 to process the lever position signals generated by the Hall generators H1 and H2 and then control the direction of rotation of an electric motor 48 based on the position signals. The latch 46 serves to temporarily store the position signals and, when enabled, to pass the stored signals to the microprocessor 44. The microprocessor 44 is designed to determine the current position of the direction control lever 16 through the use of the position signals received from the Hall generators H1 and H2. Depending on the detected lever position, the microprocessor 44 will cut off the electric current to be supplied to the electric motor 48 in case of a neutral position, feed the electric current to the electric motor 48 in a first direction to cause forward rotation of the motor 48 in case of a forward position, or supply the electric current to the electric motor 48 in a second direction to cause reverse rotation of the motor 48 in case of a reverse position.

Figure 7:
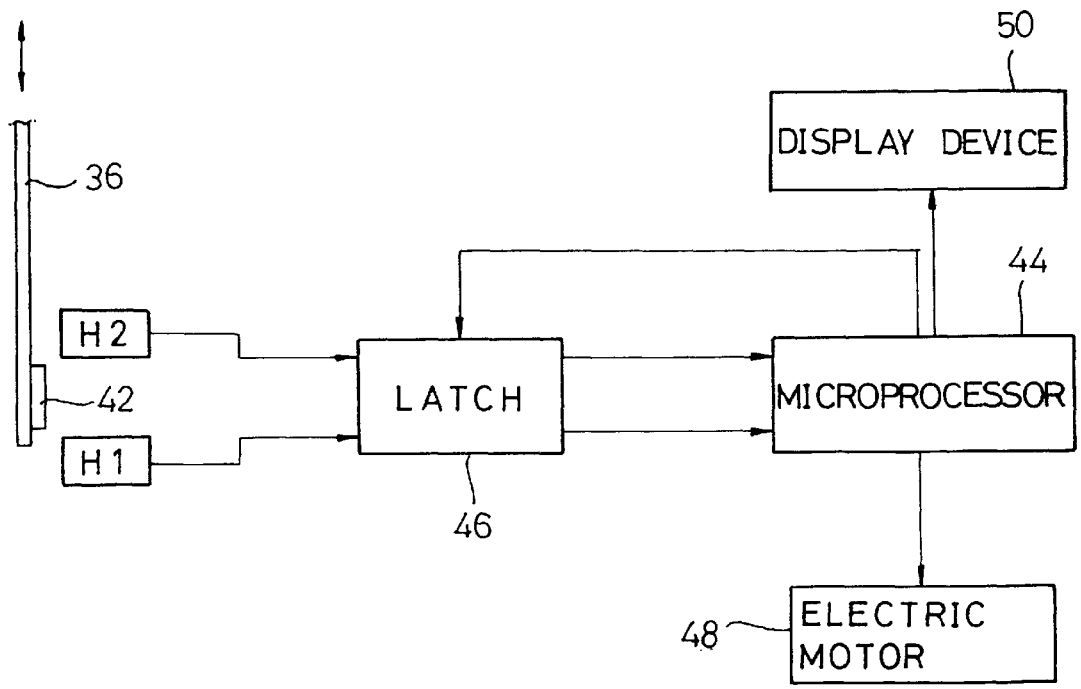
FIG. 7 is a block diagram showing the electronic circuit employed in the present motor direction control device to control the direction of rotation of the electric motor.

Operation of the present motor direction control device for electromotive vehicles will be described below in detail. In the event that the direction control lever 16 is in the neutral position, the permanent magnet 42 remains out of alignment with the first and second Hall generators H1 and H2 as shown in FIGS. 4, 5 and 7, whereby the Hall generators H1 and H2 as shown in FIGS. 4, 5 and 7, whereby the Hall generators H1 and H2 are kept deactivated to produce output voltage signals of logic level one as indicated in Table 1 below. The signals thus obtained are applied via the latch 46 to the microprocessor 44 which in turn determines the current lever position to be neutral and cuts off the electric current fed to the electric motor 48 whereby the motor 48 stops rotation.

TABLE 1

| Hall Generators | H1 | H2 | Determination |
|---|---|---|---|
| Signals Produced | 1 | 1 | Neutral |
| | 0 | 1 | Forward |
| | 1 | 0 | Reverse |
| | 0 | 0 | Error |

Shifting the direction control lever 16 into the forward position brings the permanent magnet 42 to the lowermost position in exact alignment with the first Hall generator H1. Accordingly the first Hall generator H1 become active to produce an output voltage signal of logic level zero while the second Hall generator H2 is kept deactivated to generate an output voltage signal of logic level one as noted in Table 1 above. As a result, the microprocessor 44 makes a determination that the current lever position is forward allowing the electric current to be supplied to the electric motor 48 in the first direction such that the electric motor 48 can rotate in the forward direction.

As the direction control lever 16 is shifted into the reverse position, the plastic strip 36 is subjected to an upward linear actuation to bring the permanent magnet 42 into the uppermost position in exact alignment with the second Hall generator H2. This assures that the second Hall generator H2 is activated to produce an output voltage signal of logic level zero while the first Hall generator H1 remains deactivated to generate an output voltage signal of logic level one as shown in Table 1 above. In response, the microprocessor 44 makes a determination that the current lever position is reverse, permitting the electric current to be supplied to the electric motor 48 in the second direction so that the electric motor 48 can rotate in the reverse direction.

In case where no output voltage signal of logic level one is produced from any one of the first and second Hall generators H1 and H2, the microprocessor 44 will determine that there has taken place a failure of the Hall generators. Based on this determination, the microprocessor 44 prevents the electric motor 48 from further rotation by cutting off the electric current to be supplied to the electric motor 48. The failure of the Hall generators is notified to the driver through a display device 50.

Although the foregoing description is made by taking the magnetoelectrically operated Hall generators as an example of the lever position sensors, it should be apparent to those versed in the art that other suitable sensors than the Hall generators can be employed to generate the position signals of logic level zero or one. For instance, it can be envisioned that the production of the lever position signals is accomplished by way of replacing the permanent magnet 42 with a light emitting diode and using a pair of light receiving diodes in place of the Hall generators. Such modification is a matter of design choice and still falls within the scope of the invention as defined in the claims.

While the invention has been shown and described with reference to a preferred embodiment, it should be apparent to one of ordinary skill in the art that many changes and modifications may be made without departing from the spirit and scope of the invention as defined in the claims.

What is claimed:

1. A motor direction control device for electromotive vehicles having an electric motor connected to cause the vehicles to move forwards and backwards, comprising:
    a direction control lever shiftable from a neutral position into forward or reverse position;
    a slider operatively connected to the direction control lever and slidable along a predefined moving way by the shifting operation of the direction control lever, the slider carrying a sensor activator;
    first and second sensors arranged in a spaced-apart relationship with each other along the moving way of the slider, each of the sensor capable of generating, when left deactivated, a position signal of first logic level and activatable by the sensor activator to produce a position signal of second logic level as the direction control lever is shifted into the forward or reverse position; and
    means responsive to the position signals of first and second logic for controlling the direction of rotation of the electric motor.

2. The motor direction control device for electromotive vehicles as recited in claim 1, wherein the slider comprise an elongated pliable strip having a first end connected to the direction control lever and a second end carrying the sensor activator.

3. The motor direction control device for electromotive vehicles as recited in claim 2, wherein the direction control lever is provided with a rod remaining engaged with the first end of the elongated strip and swingable together with the direction control lever for linear actuation of the elongated strip.

4. The motor direction control device for electromotive vehicles as recited in claim 1, further comprising a controller casing with a board chamber and a guide channel, the guide channel physically separated from the board chamber and slidably receiving at least a part of the slider together with the sensor activator.

5. The motor direction control device for electromotive vehicles as recited in claim 4, further comprising a logic board contained in the board chamber of the controller casing.

6. The motor direction control device for electromotive vehicles as recited in claim 5, wherein the first and second sensors are disposed on the logic board along the length of the guide channel.

7. The motor direction control device for electromotive vehicles as recited in claim 1, wherein the sensor activator comprises a permanent magnet fixedly secured to the slider.

8. The motor direction control device for electromotive vehicles as recited in claim 7, wherein the first and second sensors comprise magnetoelectric sensors activatable by the magnetic flux of the permanent magnet.

9. The motor direction control device for electromotive vehicles as recited in claim 8, wherein the magnetoelectric sensors comprise Hall generators capable of producing an output voltage signal of logic level one, when left deactivated, and generating an output voltage signal of logic level zero, when activated.

10. The motor direction control device for electromotive vehicles as an electric motor connected to cause the vehicles to move forwards and backwards, comprising:
    a direction control lever shiftable from a neutral position into forward or reverse position;
    an elongated pliable strip operatively connected to the direction control lever and slidable along a predefined moving way by the shifting operation of the direction control lever, the strip carrying a permanent magnet,
    first and second magnetoelectric sensors arranged in a spaced-apart relationship with each other along the moving way of the elongated strip, each of the magnetoelectric sensors capable of generating, when left deactivated a position signal of first logic level and activatable by the permanent magnet to produce a position signal of second logic level as the direction control level is shifted into the forward or reverse position; and
    a microprocessor responsive to the position signal of first and second logic levels for controlling the direction of rotation of the electric motor.

11. The motor direction control device for electromotive vehicles as recited in claim 10, wherein the sensor activator comprises a permanent magnet fixedly secured to the slider.

12. The motor direction control device for electromotive vehicles as recited in claim 11, wherein the first and second sensors comprise magnetoelectric sensors activatable by the magnetic flux of the permanent magnet.

13. The motor direction control device for electromotive vehicles as recited in claim 12, wherein the magnetoelectric sensors comprise Hall generators capable of producing an output voltage signal of logic level one, when left deactivated, and generating output voltage signal of logic level zero, when activated.

14. The motor direction control device for electromotive vehicles as recited in claim 10, further comprising display means associated with the microprocessor for displaying failure of the magnetoelectric sensors.

* * * * *